(12) United States Patent
Chen (10) Patent No.: US 10,661,901 B2
(45) Date of Patent: May 26, 2020

(54) ECONOMY CLASS CABIN WITH SLEEPING BERTH IN PASSENGER AIRCRAFT

(71) Applicant: Gang Chen, Yangzhou (CN)

(72) Inventor: Gang Chen, Yangzhou (CN)

( * ) Notice: Subject to any disclaimer, the term of this patent is extended or adjusted under 35 U.S.C. 154(b) by 0 days.

(21) Appl. No.: 16/147,626

(22) Filed: Sep. 29, 2018

(65) Prior Publication Data

US 2019/0031350 A1    Jan. 31, 2019

Related U.S. Application Data

(63) Continuation of application No. PCT/CN2016/081691, filed on May 11, 2016.

(51) Int. Cl.
*B64D 11/00* (2006.01)
*B64D 11/06* (2006.01)
*A47C 19/00* (2006.01)

(52) U.S. Cl.
CPC .............. *B64D 11/00* (2013.01); *A47C 19/00* (2013.01); *B64D 11/0601* (2014.12); *B64D 2011/0069* (2013.01)

(58) Field of Classification Search
CPC . B64D 11/00; B64D 11/0601; B64D 11/0602; B64D 11/0604; B64D 11/0606; B64D 2011/0069; B64D 2011/0076; B64D 2011/0084
See application file for complete search history.

(56) References Cited

U.S. PATENT DOCUMENTS

| 4,589,612 | A | * | 5/1986 | Halim | B61D 1/04 |
| | | | | | 105/316 |
| 6,056,239 | A | * | 5/2000 | Cantu | B64D 11/06 |
| | | | | | 244/118.5 |
| 6,152,400 | A | * | 11/2000 | Sankrithi | B64D 11/00 |
| | | | | | 105/315 |
| 9,409,648 | B2 | | 8/2016 | Eakins | |
| 2003/0029967 | A1 | * | 2/2003 | Mills | B64D 11/00 |
| | | | | | 244/118.5 |

(Continued)

FOREIGN PATENT DOCUMENTS

| CN | 1035086 A | 8/1989 |
| CN | 2312155 Y | 3/1999 |

(Continued)

*Primary Examiner* — Richard G Davis
(74) *Attorney, Agent, or Firm* — Erson IP (Nelson IP)

(57) ABSTRACT

An economy class cabin with sleeping berths in a passenger aircraft, includes cabin floor, multi-tier sleeping berths, an air duct, an overhead bin, seats, a baggage storage place, a shoe storage place and multi-tier baggage racks. The multi-tier sleeping berths are disposed in parallel to longitudinal axis of the aircraft; a longitudinal partition board is disposed between two abreast sleeping berths; and two latitudinal partition boards are respectively disposed at two opposite ends of each of the sleeping berths and a private space is formed by the longitudinal partition board, two latitudinal partition boards, a bed cushion and a slidable curtain. The present invention has simple structure and reasonable utilization of compact space, enables all or some of passengers of the economy class to be in a lie-flat sleeping state in half of the time in intercontinental flight.

8 Claims, 6 Drawing Sheets

(56) References Cited

U.S. PATENT DOCUMENTS

| | | | |
|---|---|---|---|
| 2003/0218095 A1* | 11/2003 | Saint Jalmes | B64D 11/00 244/118.5 |
| 2005/0178904 A1 | 8/2005 | Mills | |
| 2005/0178909 A1* | 8/2005 | Mills | B64D 11/00 244/118.6 |
| 2015/0266581 A1* | 9/2015 | Roese | B64D 11/0015 244/118.6 |

FOREIGN PATENT DOCUMENTS

| | | |
|---|---|---|
| CN | 2609809 Y | 4/2004 |
| CN | 1950256 A | 4/2007 |
| CN | 03153787 A | 6/2013 |
| CN | 104071338 A | 10/2014 |
| CN | 104470801 A | 3/2015 |
| CN | 205440883 U | 8/2016 |
| FR | 2924682 B1 | 8/2010 |
| KR | 20100083488 A | 7/2010 |
| WO | 2011077364 A1 | 6/2011 |

* cited by examiner

FIG. 1 of the prior art

FIG. 6 of the prior art

ECONOMY CLASS CABIN WITH SLEEPING BERTH IN PASSENGER AIRCRAFT

CROSS-REFERENCE TO RELATED APPLICATIONS

This application is a continuation of International Patent Application No. PCT/CN2016/081691 with a filing date of May 11, 2016, designating the United States, and further claims priority to Chinese Patent Application No. 201610203349.4 with a filing date of Mar. 31, 2016. The content of the aforementioned applications, including any intervening amendments thereto, are incorporated herein by reference.

TECHNICAL FIELD

The present invention relates to layout of passenger aircraft cabin, and particularly relates to layout of economy class of cabin.

BACKGROUND OF THE PRESENT INVENTION

Taking intercontinental flight with economy class is relatively inexpensive. However, because of long time sitting in narrow space, most of passengers are exhausted. Although business class is spacious and comfortable, high price is unaffordable for most passengers. Globally a large number of intercontinental passengers always face this dilemma.

SUMMARY OF PRESENT INVENTION

To solve the above-mentioned problems, the present invention discloses an economy class cabin with sleeping berths in passenger aircraft, including cabin floor, multi-tier sleeping berths, air duct, overhead bin, seats, baggage storage place, shoe storage place and multi-tier baggage racks; the multi-tier sleeping berths are disposed in parallel to longitudinal axis of the aircraft; a longitudinal partition board is disposed between two abreast sleeping berths; two latitudinal partition boards are respectively disposed at two opposite ends of each of the sleeping berths and a private space is formed by the longitudinal partition board, two latitudinal partition boards, a bed cushion and a slidable curtain.

Preferably, the longitudinal partition board is in a polyline shape to make each of the sleeping berths be wider at one end than the other opposite end so as to accommodate two abreast passengers in opposite directions.

Preferably, some ultra-long berths are disposed among the multi-tier sleeping berths to ensure that tall passengers lie completely flat.

Preferably, one to two groups of the multi-tier sleeping berths can be disposed according to cabin width of the aircraft; and when two groups are disposed, a third aisle is disposed between the two groups.

Preferably, the multi-tier sleeping berths can be two tiers at both side of the longitudinal board.

Preferably, the multi-tier sleeping berths can be two tiers at one side of the longitudinal board and three tiers at the other side of the longitudinal board.

Preferably, the multi-tier sleeping berths can be three tiers at both side of the longitudinal board.

Preferably, the baggage storage place or the shoe storage place is disposed between the lowest tier of the sleeping berths and the cabin floor according to the space therebetween.

Preferably, each of the sleeping berths is paired with one seat so that the passengers of the economy class in intercontinental flight sit and lie at different times, i.e., paired passengers of the economy class sit halfway and lie halfway.

Beneficial effects: the present invention has simple structure and reasonable utilization of compact space, enables all or some of passengers of the economy class to be in a lie-flat sleeping state in half of the time in intercontinental flight, thereby greatly reducing travel fatigue. The degree of comfort of the present invention greatly exceeds that of the ordinary economy class, and even greatly exceeds that of the normal super-economy class. The cost of paired sitting and lying combination is close to the cost of the seats of the ordinary economy class and is much lower than the cost of the normal super-economy class.

In the figures: 1, cabin floor; 2, multi-tier sleeping berths; 3, air duct; 4, overhead bin; 5, seats; 6, baggage storage place; 7, shoe storage place; 8, multi-tier baggage racks; 9, longitudinal partition board; 10, latitudinal partition board; 11, bed cushion; and 12, slidable curtain.

DETAILED DESCRIPTION OF PREFERRED EMBODIMENTS

The present invention is further described in detail with reference to the drawings.

Embodiment 1

Figure 1:
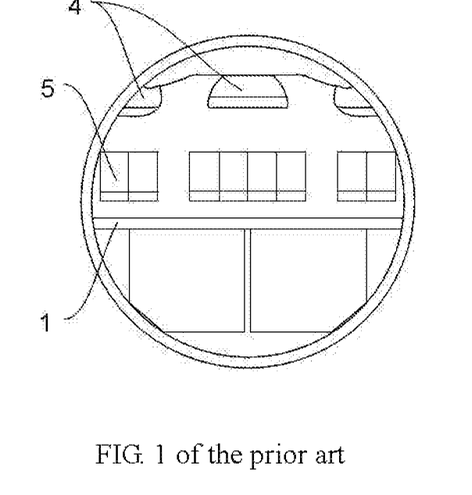
FIG. 1 is a front view of a standard layout of the economy class of A330 passenger aircraft in the prior art.

FIG. 1 shows a front view of a standard layout of the economy class of A330 passenger aircraft. Seats 5 are disposed above the cabin floor 1. The overhead bin 4 is disposed above the seats 5. The economy class of A330 passenger aircraft has two aisles. The seats 5 are arranged in 8 columns with a layout of "2+4+2".

Figure 2:
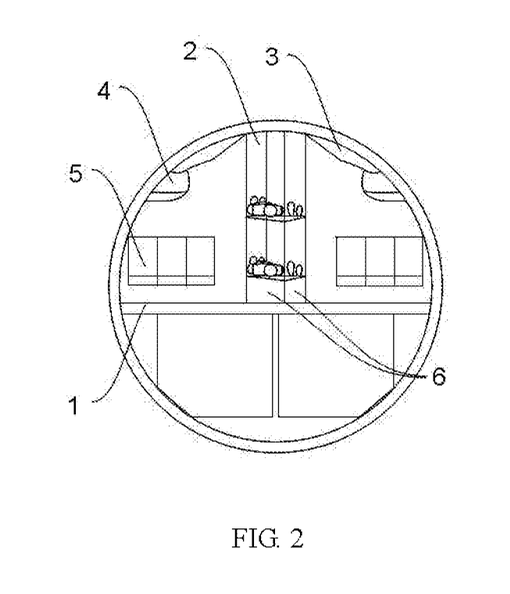
FIG. 2 is a front view of a layout of combination of seats and low-density multi-tier sleeping berths in the economy class of A330 passenger aircraft according to the present disclosure.

FIG. 2 shows a front view of a layout of combination of seats and low-density multi-tier sleeping berths in the economy class of A330 passenger aircraft. The economy class includes the cabin floor 1, multi-tier sleeping berths 2, air duct 3, overhead bin 4, seats 5 and baggage storage place 6. The multi-tier sleeping berths 2 are disposed in parallel to longitudinal axis of the aircraft. Double tiers of sleeping berths are disposed to ensure that a spacing between two tiers is not less than 40 inches. The baggage storage place 6 is disposed between the lowest tier of the sleeping berths 2 and the cabin floor 1. It can be seen from the figure that the multi-tier sleeping berths are connected to the top and bottom of the cabin; and supporting structures of the sleeping berths are connected with a fuselage structure into a whole.

Figure 3:
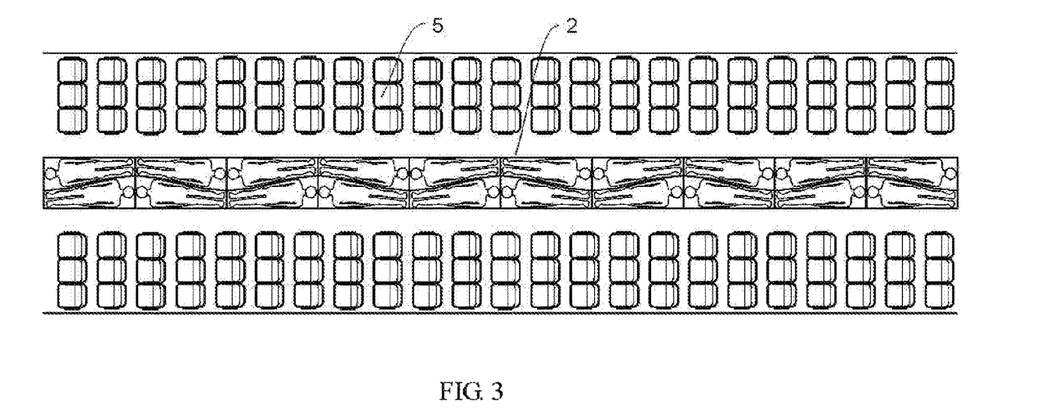
FIG. 3 is a top view of a layout of combination of seats and low-density multi-tier sleeping berths in the economy class of A330 passenger aircraft according to the present disclosure.

FIG. 3 shows a top view of a layout of combination of seats and low-density multi-tier sleeping berths in the economy class of A330 passenger aircraft. Pitch of seats 5 is 32 inches. The average length of each sleeping berth in the multi-tier sleeping berths 2 is 73.6 inches. Some ultra-long berths can be disposed. The quantity of the sleeping berths arranged in the same area of cabin floor is slightly less than the quantity of the seats.

Figure 4:
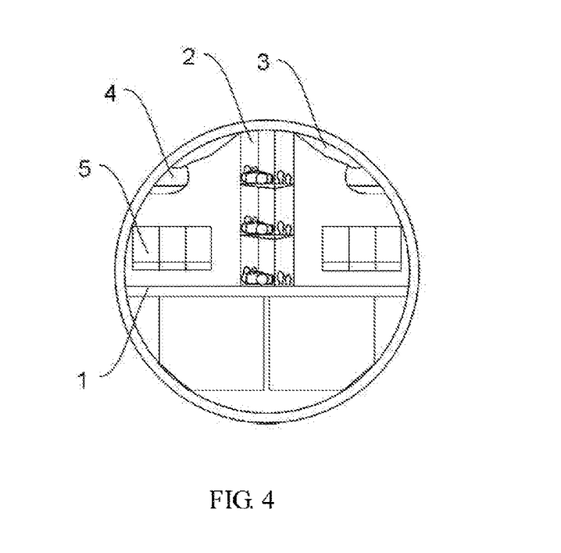
FIG. 4 is a front view of a layout of combination of seats and high-density multi-tier sleeping berths in the economy class of A330 passenger aircraft according to the present disclosure.

FIG. 4 shows a front view of a layout of combination of seats and high-density multi-tier sleeping berths in the economy class of A330 passenger aircraft. The economy class includes the cabin floor 1, the multi-tier sleeping berths 2, the air duct 3, the overhead bin 4 and the seats 5. The multi-tier sleeping berths 2 are disposed in parallel to longitudinal axis of the aircraft. Three tiers of sleeping berths are disposed to ensure that a spacing between two tiers reaches 37 inches. The lowest tier of the multi-tier sleeping berths 2 is directly disposed on the cabin floor 1.

Figure 5:
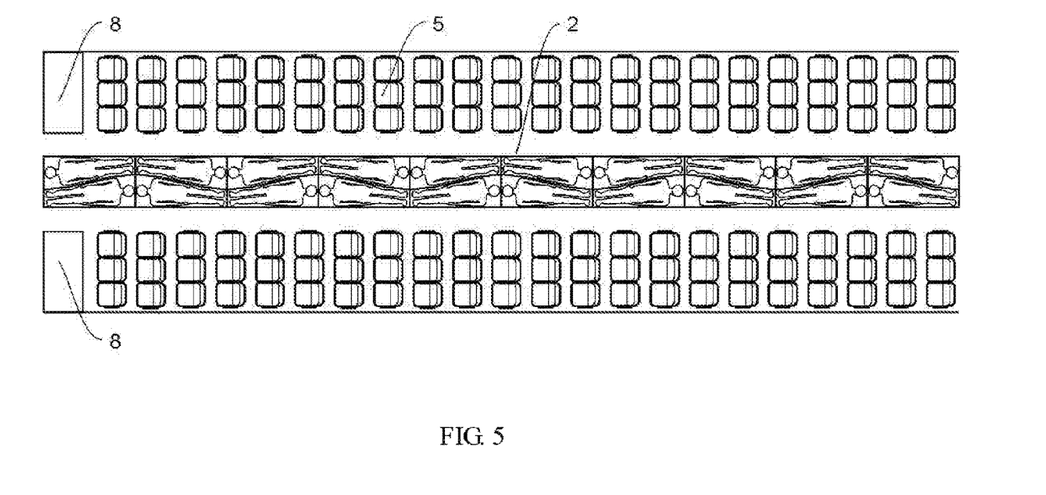
FIG. 5 is a top view of a layout of combination of seats and high-density multi-tier sleeping berths in the economy class of A330 passenger aircraft according to the present disclosure.

FIG. 5 shows a top view of a layout of combination of seats and high-density multi-tier sleeping berths in the economy class of A330 passenger aircraft. One row of seats 5 is reduced to arrange multi-tier baggage racks 8. The quantity of the sleeping berths arranged in the same area of cabin floor is larger than the quantity of the seats.

According to the above arrangement, the economy, class of A330 passenger aircraft has both seats and the multi-tier sleeping berths. Each of the sleeping berths 2 is paired with one seat so that part of passengers of the economy class in intercontinental flight sit and lie at different times, i.e., paired passengers of the economy class sit halfway and lie halfway, thereby greatly reducing travel fatigue. The degree of comfort of the economy class greatly exceeds that of the ordinary economy class, and even greatly exceeds that of the normal super-economy class. The cost of paired sitting and lying combination is close to the cost of the seats of the ordinary economy class and is much lower than the cost of the normal super-economy class.

Embodiment 2

Figure 6:
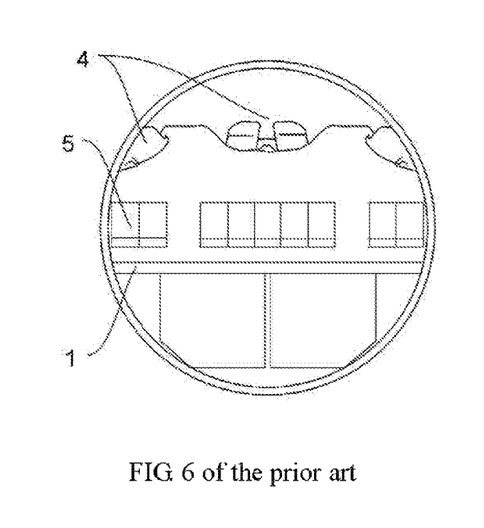
FIG. 6 is a front view of a standard layout of the economy class of B777 passenger aircraft in the prior art.

FIG. 6 shows a front view of a standard layout of an economy class of B777 passenger aircraft. Seats 5 are disposed above the cabin floor 1. The overhead bin 4 is disposed above the seats 5. The economy class of B777 passenger aircraft has two aisles. The seats 5 are arranged in 9 columns with a layout of "2+5+2".

Figure 7:
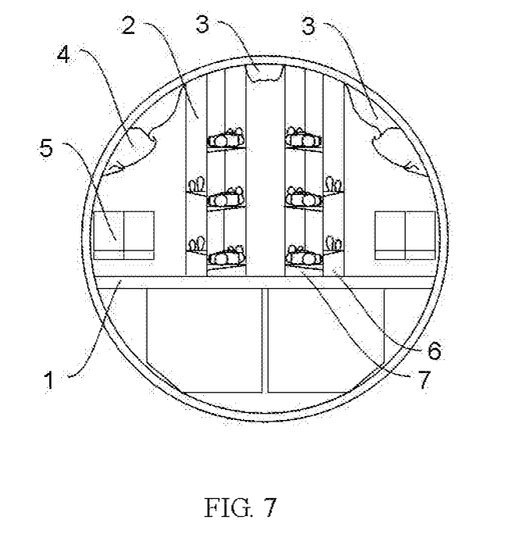
FIG. 7 is a front view of a layout of combination of seats and low-density multi-tier sleeping berths in the economy class of B777 passenger aircraft according to the present disclosure.

FIG. 7 shows a front view of a layout of combination of seats and low-density multi-tier sleeping berths in the economy class of B777 passenger aircraft. The economy class includes the cabin floor 1, the multi-tier sleeping berths 2, the air duct 3, the overhead bin 4, the seats 5, the baggage storage place 6 and the shoe storage place 7. The multi-tier sleeping berths 2 are disposed in parallel to longitudinal axis of the aircraft. Double tiers and three tiers of sleeping berths are disposed to ensure that a spacing between two adjacent tier is not less than 40 inches. The baggage storage place 6 and the shoe storage place 7 are disposed between the lowest tier of the sleeping berths 2 and the cabin floor 1. A third aisle is disposed between two groups of the sleeping berths.

Figure 8:
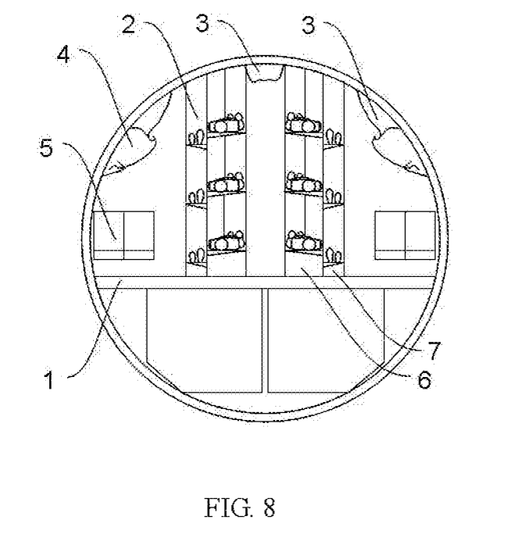
FIG. 8 is a front view of a layout of combination of seats and high-density multi-tier sleeping berths in the economy class of B777 passenger aircraft according to the present disclosure.

FIG. 8 shows a front view of a layout of combination of seats and high-density multi-tier sleeping berths in the economy class of B777 passenger aircraft. Three tiers of sleeping berths 2 are disposed to ensure that a spacing between two adjacent tiers is not less than 40 inches. The baggage storage place 6 and the shoe storage place 7 are disposed between the lowest tier of the sleeping berths 2 and the cabin floor 1.

Figure 9:
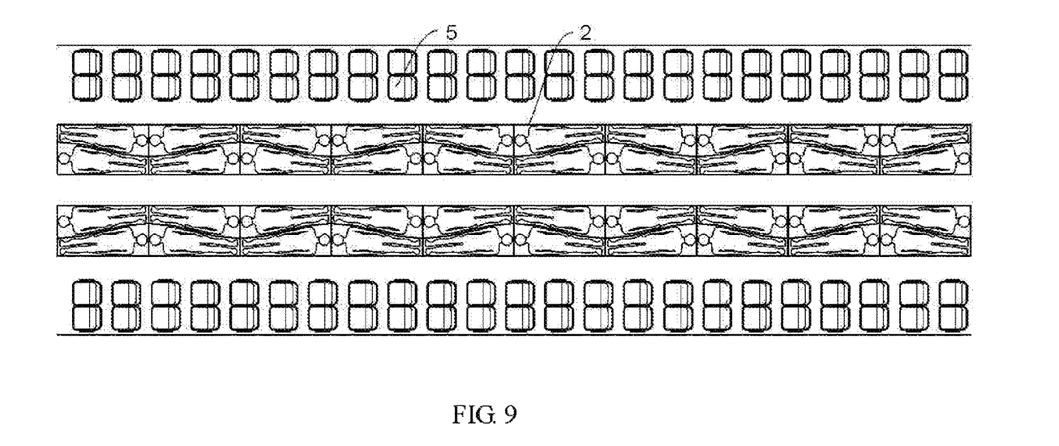
FIG. 9 is a top view of a layout of combination of seats and multiple-tier sleeping berths in the economy class of B777 passenger aircraft according to the present disclosure.

FIG. 9 shows a top view of a layout of combination of seats and multi-tier sleeping berths in the economy class of B777 passenger aircraft. Pitch of seats 5 is 32 inches. The average length of each sleeping berth in the multi-tier sleeping berths 2 is 73.6 inches. Some ultra-long berths can be disposed. The quantity of the sleeping berths arranged in the same area of cabin floor is slightly less than the quantity of the seats when low-density multi-tier berths are arranged, and is larger than the quantity of the seats when high-density multi-tier berths are arranged.

Figure 10:
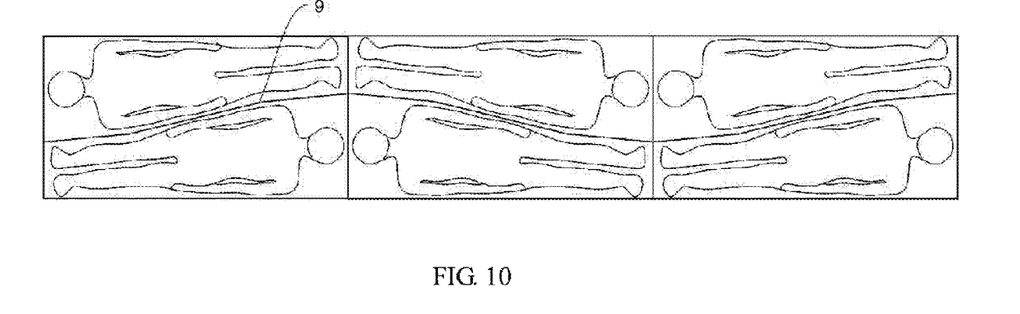
FIG. 10 is a local top view of multiple-tier sleeping berths.

FIG. 10 shows a local top view of multiple-tier sleeping berths. Because abreast passengers are separated transversely through the longitudinal partition board 9, so that heads and feet are staggered. The total width of two abreast berths may not exceed 40 inches. The average length of each sleeping berth is 73.6 inches. Some ultra-long berths can be disposed.

Figure 11:
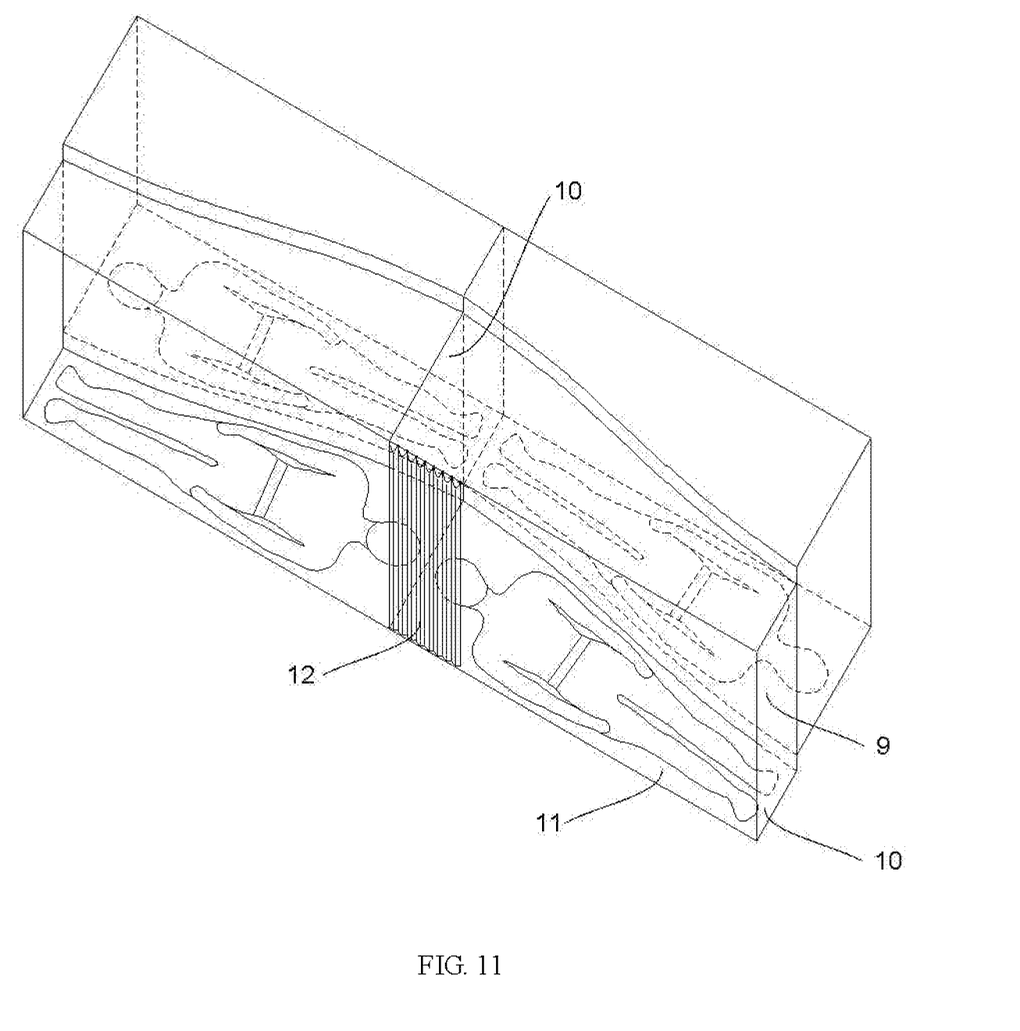
FIG. 11 is a local axonometric drawing of multiple-tier sleeping berths.

FIG. 11 shows a local axonometric drawing of the sleeping berths. It can be seen that the longitudinal partition board 9 between the abreast berths, two latitudinal partition boards 10 on two opposite ends of each of the sleeping berths, a bed cushion 11 and a slidable curtain 12 jointly form a private space. The heights of the bed cushion 11 of the abreast berths can be different as shown in FIG. 7 and FIG. 8, and can also be the same as shown in FIG. 2 and FIG. 4. The bed cushion 11 of the upper berth and the middle berth service as the ceilings of the middle berth and the lower berth respectively. The ceiling of the cabin services as the ceiling of the upper berth. Ladders for climbing and safety belts can be flexibly arranged according to actual needs.

According to the above arrangement, the economy class of B777 passenger aircraft has both seats and the multi-tier sleeping berths. The total quantity of the berths might be equal to the total quantity of the seats. Each of the sleeping berths 2 is paired with one seat so that all passengers of the economy class in intercontinental flight sit and lie at different times, i.e., paired passengers of the economy class sit halfway and lie halfway, thereby realizing comfort which is greatly better than that of the normal super-economy class with the cost of the ordinary economy class.

Through the comparison of embodiment 1 and embodiment 2, it can be discovered that A330 passenger aircraft is limited by the size of its own cabin and only part of passengers of the economy class can sit and lie at different times. Therefore, the ordinary economy class and a time-sharing lie-flat economy class shall be arranged simultaneously. Although the cost of the time-sharing lie-flat economy class is almost the same as the cost of the ordinary economy class, airlines can still distinguish the ordinary economy class and the time-sharing lie-flat economy class through ticket price to obtain better economy benefits. B777 passenger aircraft benefits from a spacious size of the passenger cabin, all passengers of the economy class can lie flat at different times. Therefore, only the single time-sharing lie-flat economy class needs to be, arranged. Airlines can select the ticket price slightly higher than that of the ordinary economy class to obtain better economy benefits or still execute the ticket price of the ordinary economy class to obtain stronger competitiveness.

The above specific embodiments are only examples for the purpose of clear description to the present invention, and should not be construed as limitation to the present invention. Various changes or modifications will become apparent to those of ordinary skill in the art under the teaching of the present disclosure. There is no need and there is no way to exhaust all embodiments. However, apparent changes or modifications derived from this disclosure are still within the protection scope of the present invention.

I claim:

1. An economy class cabin with sleeping berths in a passenger aircraft, comprising
    cabin floor (1), multi-tier sleeping berths (2), an air duct (3), an overhead bin (4), seats (5), a baggage storage place (6), a shoe storage place (7) and multi-tier baggage racks (8),
    wherein the multi-tier sleeping berths (2) are disposed in parallel to a longitudinal axis of the aircraft; the seats (5) are disposed in parallel with the multi-tier sleeping berths (2) and located on both sides of the multi-tier sleeping berths (2) at a distance;
    each tier of the multi-tier sleeping berths (2) comprises two abreast berths, and a partition board (9) is disposed between the two abreast berths on the same tier of the multi-tier sleeping berths (2);
    two latitudinal partition boards (10) are respectively disposed at two opposite ends of each of the sleeping berths (2); and a private space is formed by the longitudinal partition board (9), two latitudinal partition boards (10), a bed cushion (11), and a slidable curtain (12).

2. The economy class cabin with sleeping berths in the passenger aircraft according to claim 1, wherein the longitudinal partition board (9) is in a polyline shape to make each of the sleeping berths be wider at one end than the other opposite end so as to accommodate two abreast passengers in opposite directions.

3. The economy class cabin with sleeping berths in the passenger aircraft according to claim 1, wherein one to two groups of the multi-tier sleeping berths (2) are disposed according to cabin width of the aircraft; and when two groups are disposed, a third aisle is disposed between the two groups.

4. The economy class cabin with sleeping berths in the passenger aircraft according to claim 1, wherein the multi-tier sleeping berths (2) are two tiers at both side of the longitudinal board.

5. The economy class cabin with sleeping berths in the passenger aircraft according to claim 1, wherein the multi-tier sleeping berths (2) are two tiers at one side of the longitudinal board and three tiers at the other side of the longitudinal board.

6. The economy class cabin with sleeping berths in the passenger aircraft according to claim 1, wherein the multi-tier sleeping berths (2) are three tiers at both side of the longitudinal board.

7. The economy class cabin with sleeping berths in the passenger aircraft according to claim 1, wherein the baggage storage place (6) or the shoe storage place (7) is disposed between the lowest tier of the sleeping berths (2) and the cabin floor (1) according to a space therebetween.

8. The economy class cabin with sleeping berths in the passenger aircraft according to claim 1, wherein each of the sleeping berths (2) is paired with one seat so that the passengers of the economy class in intercontinental flight sit and lie at different times, i.e., paired passengers of the economy class sit halfway and lie halfway.

* * * * *